United States Patent [19]
Gerlach et al.

[11] 3,802,857
[45] Apr. 9, 1974

[54] JET PLATE FOR FIBERS AND THE LIKE PARTICULARLY OF GLASS

[75] Inventors: Otto Gerlach, Steinach; Bernd Meusel, Foritz; Hans Heinz, Steinach; Gerhard Greiner-Bar, Lauscha; Richard Resch; Gunter Schindhelm, both of Steinach, all of Germany

[73] Assignee: VEB Trisola Steinach, Trobach, Steinach (Thur.), Germany

[22] Filed: July 7, 1972

[21] Appl. No.: 269,653

[52] U.S. Cl. .................................. 65/1, 65/374
[51] Int. Cl. ............................................ C03b 37/02
[58] Field of Search .............................. 65/1, 374

[56] References Cited
UNITED STATES PATENTS

| 2,814,657 | 11/1957 | Labino | 65/1 X |
| 3,125,329 | 3/1964 | McFadden | 65/1 |
| 3,278,282 | 10/1966 | Jaray | 65/1 |

*Primary Examiner*—Robert L. Lindsay, Jr.
*Attorney, Agent, or Firm*—Albert C. Nolte, Jr.; Edward B. Hunter; C. Bruce Hamburg

[57] ABSTRACT

A jet plate consisting of a plurality of jet plate segments made of silica, magnesite, or alumina-containing material. The individual segments are combined to form the plate. At the joints between the segments, crystallized portions of the glass provide the required seal.

2 Claims, 2 Drawing Figures

PATENTED APR 9 1974  3,802,857

JET PLATE FOR FIBERS AND THE LIKE PARTICULARLY OF GLASS

BACKGROUND AND NATURE OF THE INVENTION

It has been known to make glass filaments and the like in a melting device having a ceramic jet plate. The electric current passes through the liquid glass melt. As the melt passes through restricted jet apertures in the jet plate, extra local heating results whereby the melt is more liquified, directly above these apertures.

It has been the drawback of known melting devices that the jet plate could not be very large, as it was technologically impossible to make jet plates with a side length of more than about 40 centimeters. With such relatively small melting devices, it was quite impossible economically to produce fiber mats, fleeces and the like. However, melting devices with a side length of at least 100 centimeters are practically needed for economical operation in the production of such goods.

The invention overcomes the problem by the use of a ceramic jet plate of the required side length, this plate being of segmental construction and consisting of the ceramic material without additional structural material. The fibers coming from the new jet plate can be combined directly into the desired fiber mats, fleeces, and the like. According to the invention, this is achieved by combining the several segments into the plate and sealing the joints between them by the glass itself.

DRAWINGS

Figure 1:
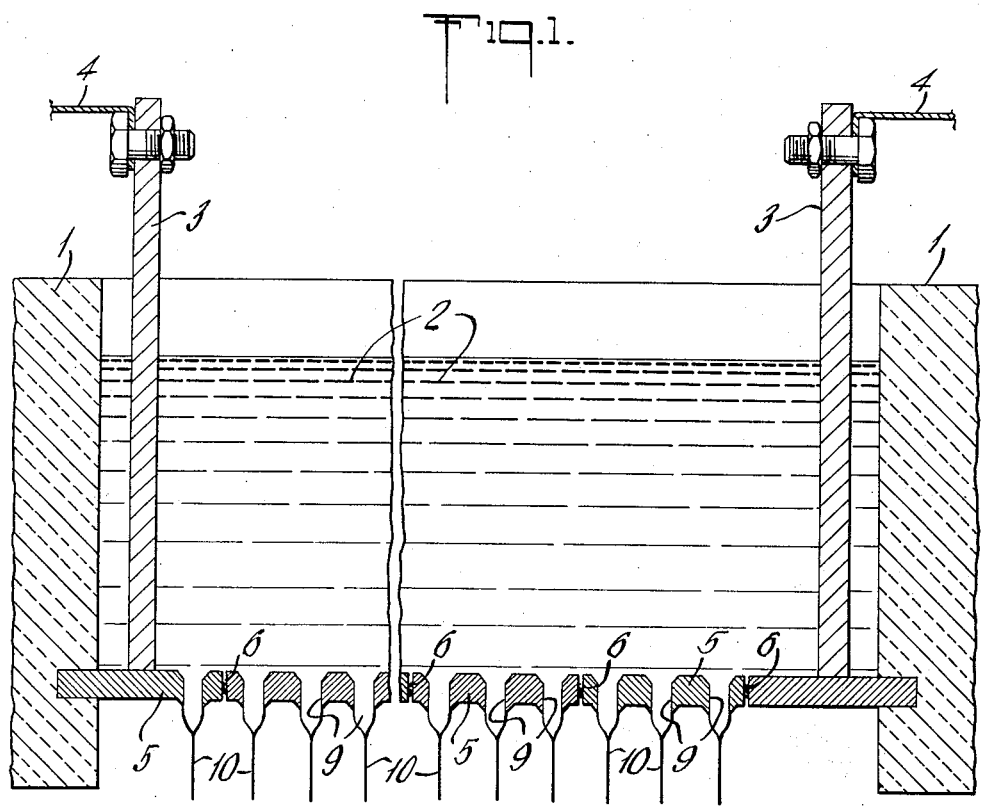
FIG. 1 is a partial longitudinal section through an electric melting unit having a jet plate according to the invention.
Figure 2:
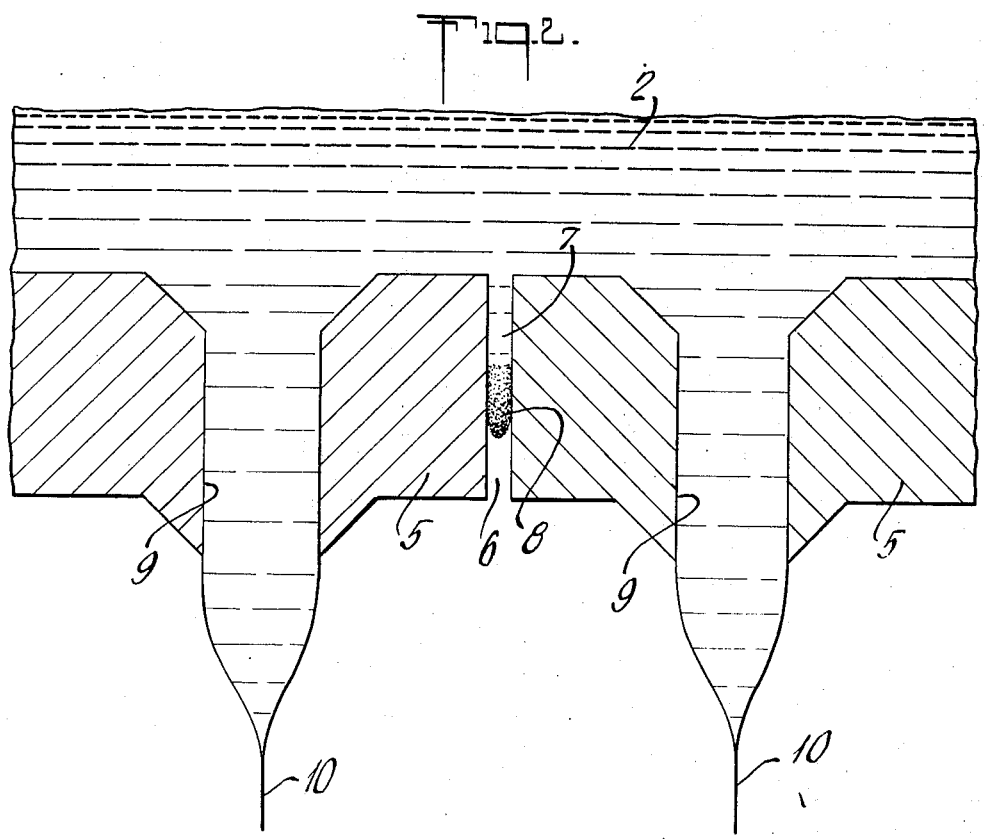
FIG. 2 is an enlarged detail from FIG. 1.

Electric melting unit 1 is shown full of molten glass 2. Glass 2 is heated by the current applied through electrodes 3 which can be made of graphite, molybdenum, platinum, iron or other material. Current is supplied through connectors 4.

According to the invention, individual jet plate segments 5 are used, which are joined together at butt joints 6. The segments 5 are supported by suitable structure, not shown. Glass 7, entering narrow butt joints 6, meets with high resistance against any flow of the glass through the same. Therefore and since the glass still has relatively high viscosity and surface tension, a small mass 7 of the glass comes to rest in each butt joint 6.

A typical temperature gradient of about 350°C exists between the glass furnace space above the plate and the underside of the plate, so that the temperature at the underside is about 800°C when the temperature of melt 2 is about 1,150°C. In the joints between the segments of the plate, devitrification phenomena occur. The glass which comes to rest in the joint has a temperature of about 900°C, which is known to lead to maximum crystallization of glass material at rest. A tip 8 of glass body 7 in butt joint 6 can be expected to be crystallized.

Accordingly, this material 7, 8 constitutes an effective seal between the individual jet plate segments 5.

The conditions are different in jet apertures 9, wherein the glass meets with resistance, as noted above, but with considerably less resistance than in butt joints 6. The ratio of thickness of the plate to the jet diameter can conveniently be between 1:1 and 4:1, when the plates have such considerable thickness, and such apertures, as are known from conventional practice. Joints 6, by contrast, have a width from segment to segment which at most amounts to a small fragment of the smallest practical diameter for a jet 9. The length of a joint generally equals the side length of the plate segment.

It will be realized that Joule's law is utilized in the melting process. The material to be heated, itself, provides the work resistance as the electric current passes through it. Alternating current is used for the heating of the melt, as glass and the like has the characteristics of an electrolyte.

Glass melt 2 passes jet apertures 9 by its own hydrostatic pressure, whereas it comes to rest and crystallation in the narrower butt joints 6. Glass beads are thus extruded from the jet apertures, which are followed by glass fibers 10, while crystallized glass tips 8 remain in the joints.

Since the distances between jet apertures 9 can be as close as in former practice and since according to the invention, large numbers of these apertures can be provided by a single segmentally combined jet plate, fibers 10 from a single melt unit 1 can be formed directly into a sizeable glass fiber mat, fleece and the like, without uneconomical joining of small segments of the mat or fleece.

At the same time, of course, it is quite possible also to produce large numbers of glass beads and the like.

What is claimed is:

1. Apparatus for producing glass fibers comprising a container, means for melting glass within the container, the base of the container constituting a jet plate, said jet plate comprising a plurality of separate sections in butted relationship, adjacent butting edges of the sections defining spaces between said sections to be sealed, and said sections each including a plurality of jet apertures, the jet apertures being of a size to allow molten glass to pass therethrough from the container to form fibers and said spaces being of lesser size than said apertures to constitute restriction means preventing the passage of glass therethrough whereby glass passing into said restriction means is solidified and seals said spaces.

2. Apparatus according to claim 1, having jet apertures which have a diameter at least one-quarter of the thickness of the jet plate sections.

* * * * *